ADAPTIVE INFORMATION RETRIEVAL SYSTEM

Filed Jan. 11, 1968 2 Sheets-Sheet 1

INVENTOR
CYRIL J. TUNIS
BY Paul M. Brenner
AGENT

ADAPTIVE INFORMATION RETRIEVAL SYSTEM

Filed Jan. 11, 1968

2 Sheets-Sheet 2

United States Patent Office 3,548,385
Patented Dec. 15, 1970

3,548,385

ADAPTIVE INFORMATION RETRIEVAL SYSTEM

Cyril J. Tunis, Endwell, N.Y., assignor to International Business Machines Corporation, Armonk, N.Y., a corporation of New York Filed Jan. 11, 1968, Ser. No. 697,211
Int. Cl. G06f *15/18, 15/40*
U.S. Cl. 340—172.5 6 Claims

ABSTRACT OF THE DISCLOSURE

An information retrieval system having an adaptive categorizer used to provide addressing of an associative memory in response to statements or interrogations made to the input of the categorizer, whereby in response to a particular inquiry, such as a set of key words, the address of information most closely related to the inquiry is generated and the corresponding information read out. The system includes feedback of additional key words to the input of the system.

BACKGROUND OF THE INVENTION

This invention relates to information retrieval systems, and particularly to an improved information retrieval system employing an adaptive categorizer.

Information retrieval systems are known in which items of information stored by suitable means are provided with "tags" or identifying elements so that upon presentation to the system of inquiries consisting of one or more "tags," the associated information will be read out of the system.

It is also known in the information retrieval art to provide associative information retrieval wherein the system is arranged to take into account interrelations from the retrieval system storage. Such an arrangement will render the system free from the necessity of precisely describing the information to be retrieved since the system itself will look for degrees of association between the input inquiries and the stored information.

Such an associative information retrieval system, if arranged to use adaptive categorizing elements for relating the tags or index items to the stored information, would be of advantage in that the system could be trained to consider the relevance of various index items as the case required.

SUMMARY OF THE INVENTION

Briefly described, this invention contemplates an information retrieval system employing an adaptive categorizer in which the weights stored in a network of linear threshold elements are used to provide an associative memory addressing facility whereby, in response to a particular inquiry (or set of key words) the address of a document or statement most closely associated with those key words will be generated.

A single threshold circuit is made to correspond to a particular statement. The overall network is trained, using "ramp" learning, so that for each given statement, the appropriate threshold circuit has the highest output sum.

When an interrogation is supplied to the system, using the key words, the threshold circuit with the greatest output sum is selected, and all others are prevented from responding. This output supplied to the associative memory is used to select information related to the statement supplied as an input to the system. Additional key words read out of the memory are added to the interrogating words, and a further retrieval takes place. The system can continue to operate until a comparison between the memory output and the input to adaptive categorizer shows that no new key words are being retrieved.

Accordingly, it is an object of this invention to provide an improved information retrieval system in which the system can be trained to consider the relevance of various index items relating to the information to be retrieved.

Another object of the invention is to provide an improved information retrieval system in which key or index items summoned during a retrieval cycle are added to the initial index to provide for further retrievals of related information.

A further object of the invention is to provide an improved information retrieval system in which additional key or index items are recovered during retrieval cycles until the system detects that no further index items are being recovered, whereupon the system ceases its retrieval operation.

BRIEF DESCRIPTION OF THE DRAWINGS

The foregoing and other objects, features and advantages of the invention will be apparent from the following more particular description of a preferred embodiment of the invention as illustrated in the accompanying drawings.

In the drawings.

Similar reference characters refer to similar parts in both of the drawings.

DESCRIPTION OF THE PREFERRED EMBODIMENT

Figure 1:
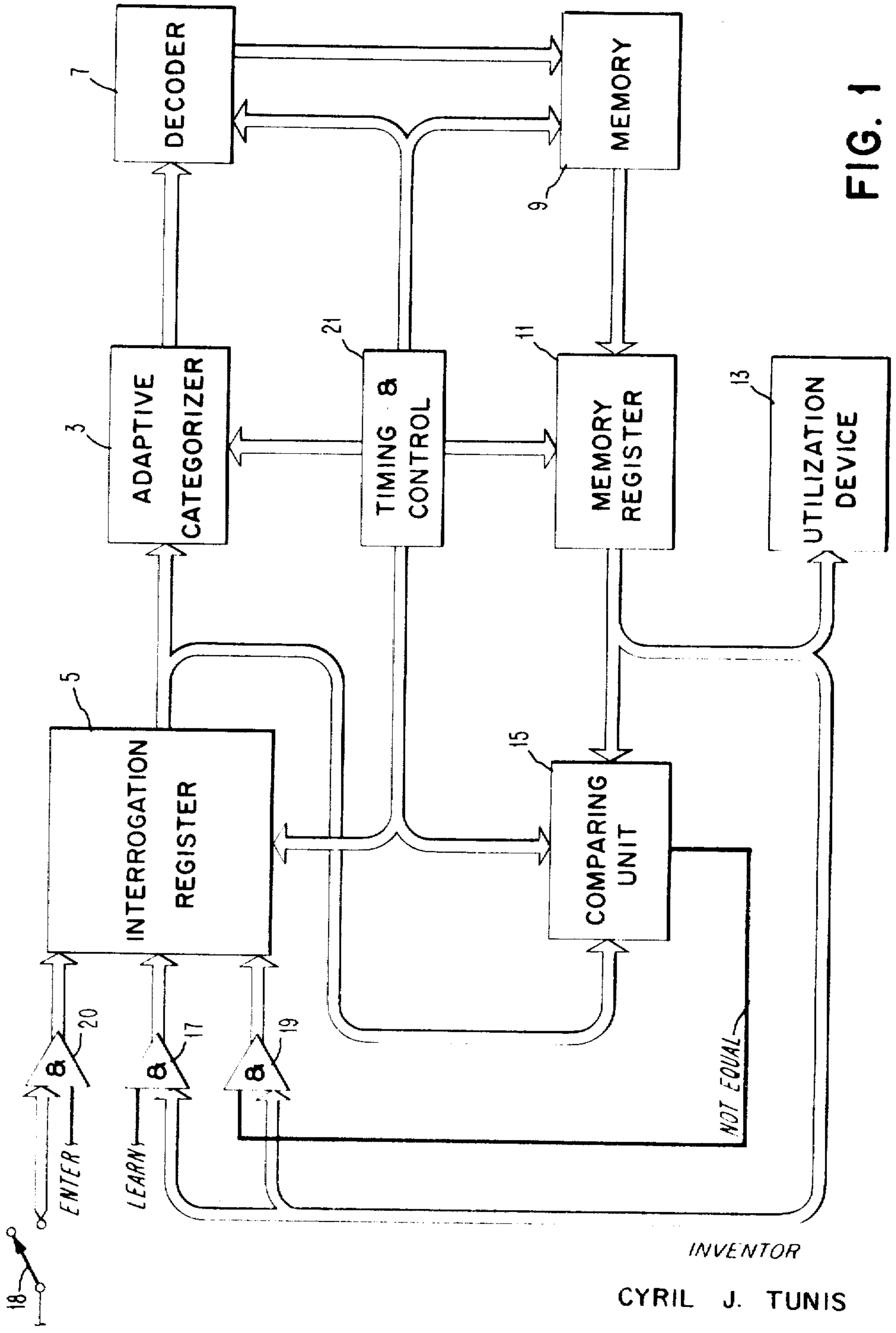
FIG. 1 of the drawings is a simplified and highly diagrammatic illustration of an information retrieval system in accordance with the present invention.

The main element of the system shown in FIG. 1 is an adaptive categorizer 3, which may be of the type shown and described in a copending patent application Ser. No. 334,765 filed Dec. 31, 1963 for "Adaptive Categorizer" by John H. King, Jr., et al., and assigned to the assignee of this application, now U.S. Pat. 3,446,950 issued May 27, 1969. The adaptive categorizer 3 includes a plurality of threshold circuits with a number of inputs, variously weighted, feeding into the threshold circuits. By means of suitable ramp type voltage controls, the circuit with the highest input sum is allowed to be on. Once this circuit comes on, remaining circuits are prevented from coming on. The inputs to the adaptive categorizer are supplied from an interrogation register 5, which contains selected combinations of key words as represented by coded inputs, that specify a statement during adaptation and also specify an interrogation during the retrieval mode of operation of the device. The outputs from the adaptive categorizer 3 are supplied via a decoder 7, to a memory or storage unit 9, which may be for example, of the magnetic core storage type. The decoder 7 is constructed and arranged so that the inputs thereto from the adaptive categorizer 3 will provide an access to each of the storage locations in the memory 9. Stored in each such location of the memory is the statement or set of key words corresponding to each of the threshold circuits in the adaptive categorizer 3, and further information such as a further address in the memory 9 where other relevant information pertaining to the statement can be obtained.

Information read out of memory 9 is supplied to memory register 11 from whence it may be supplied to utilization device 13, such as for example, an output printer or some type off visual or audible output means.

The system further includes a comparing unit 15, to which inputs are supplied from the output of memory register 11 and from the outputs of the interrogation register 5, whereby the inputs being supplied to the adaptive categorizer 3 from register 5 may be compared with the outputs supplied in accordance with the categorizing process to see whether or not an equality has been reached. The outputs from memory register 11 are also supplied via suitable input switching circuits indicated diagrammatically by the AND circuits 17 and 19, to thereby supply inputs to interrogation register 5. Information may be entered into the system initially via suitable input means, selected by switch 18, and the associated AND circuit 20. Under conditions in which the system is in a learning or adaptive mode, the switching circuits 17 will cause the outputs from memory register 11 to be supplied to the inputs of interrogation register 5. The same inputs during a retrieval mode of operation are supplied via the switching circuits 19 which are under the control of the comparing unit 15 via the "not equal" line which controls the switching circuits 19.

The proper coordination of the operation of the various components of the system and the timing of the various portions of the circuitry are under the control of a centralized timing and control unit 21.

During the adaptation or learning mode of operation, the various statements stored in the memory 9 are read out of the memory sequentially into the memory register 11 under the control of the timing and control unit 21 in a standard adaptation cycling procedure and inserted in the interrogation register 5 via the input switching control 17. During an interrogation, or retrieval, mode, the statement corresponding to the highest threshold circuit is read out into the memory register. The successively retrieved statements can either be stored temporarily in a separate memory associated utilization device 13 for example, or can be printed out as they are retrieved assuming that utilization device 13 is or includes a printing device. In either of the latter conditions the retrieved statement in the memory register is compared bit by bit to the contents of the interrogation register 5 by the comparing unit 15. Key words appearing in the memory register and not in the interrogation register are accordingly transferred to the interrogation register via the switching circuits 19, since the comparing unit 15 will not indicate any equality. Thus, a further interrogation cycle will be performed. When no new key words are obtained, the comparing unit 15 will so indicate by indicating an equality, in which case the absence of a signal on the "not equal" line will disable the input switching circuits 19, and bring the retrieval process to a halt.

Considered in another way, the system operates in such fashion that key words of statements are coded and the addresses of the stored statements including the key words are decided upon and the system is then put into a training mode whereupon presentation of the key words relevant to each statement causes an adaptive operation to take place so as to yield the address of the particular statement associated with the combination of key words. A particular threshold circuit having its output arranged to provide the address of the particular statement will be rendered effective. If there is one linear threshold element for each statement, the problem will be linearly separable, i.e. the adaptive learning process will converge. After the training operation, interrogations in the form of sequences of key words are put into the interrogation register. The system will then sequentially yield up addresses of the storage statements, or assuming sufficient storage capacity in memory 9 can yield up the statements themselves. Upon presentation of the interrogation words, the threshold element with the highest sum will be selected. The statement corresponding to this threshold element has a high correlation to the interrogation made and will then be read out of the storage and supplied to the utilization device 13 and comparing unit 15. At the same time, the key words in the statement are entered into the interrogation register 5 again, via the input including switch 18 and AND circuit 20 allowing any previous key words to remain. A new retrieval cycle is then started by the timing and control unit 21 and the threshold element with the highest sum other than the elements previously selected is chosen. Each statement is accordingly retrieved from the memory 9. This cycling will continue then until the comparing unit 15 indicates any equality between the output statements and the statements supplied through the interrogation register 5. At this time, sufficient relevant information will presumably have been recovered from the system, and the adaptation will cease.

Figure 2:
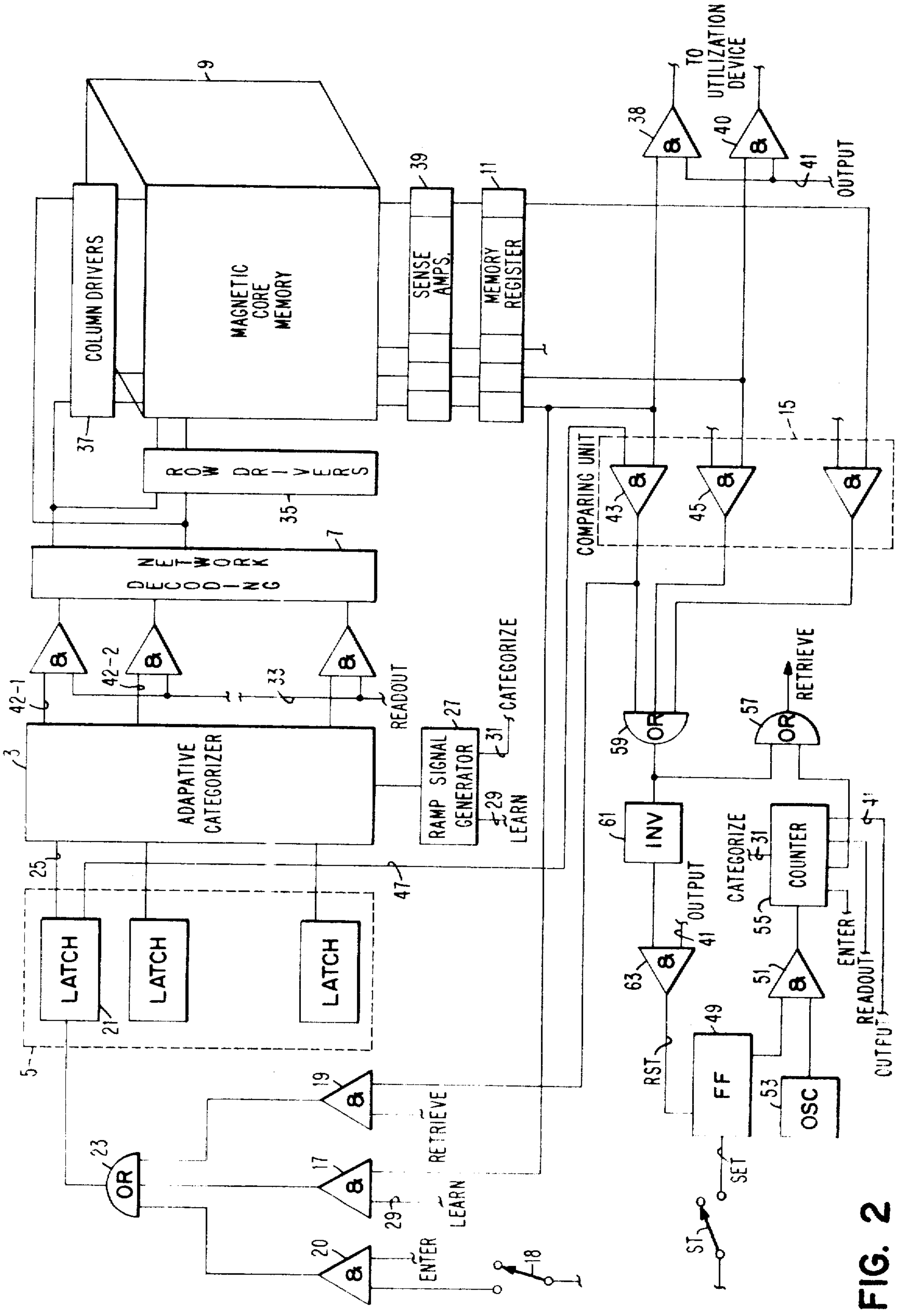
FIG. 2 is a diagrammatic illustration of the arrangement shown in FIG. 1, showing certain features of the system in greater detail.

Referring now to FIG. 2, there is shown in more detail a system of the type shown in FIG. 1 and described above.

Only representative circuitry is shown associated with single channels in the system, it being understood that as many parallel channels are provided as are necessary to provide the necessary number of information items.

The interrogation register 5 comprises a plurality of latches such as latch 21, which is arranged to be turned on by the supply thereto of signal 5 from an input OR circuit 23, in which the outputs of the input AND circuits 17, 19 and 20 are combined. The latches may be reset under normal conditions by a suitable reset circuit (not shown) and when set in their on condition by inputs supplied through the input AND circuits and the OR circuits 23, are effective to supply information input signals on the line 25 to the appropriate input of the adaptive categorizer unit 3.

When utilizing an adaptive categorizer of the type disclosed in the above-mentioned application, a ramp signal generator is employed to control the setting on of the appropriate threshold circuits, such ramp signal generator being indicated at 27, and being of the usual variety which provides suitable time-varying signals to the adaptive categorizer upon the supply to the generator of the control signals designated as LEARN and CATEGORIZE, supplied on lines 29 and 31.

The output signals from the adaptive categorizer 3 appear on individual output lines for each item of information such as the lines shown and designated by the reference characters 42—1 and 42—2, these reference characters corresponding to similar output signal lines in the referred-to application. The signals appearing on these lines are supplied to a plurality of AND circuits all governed by a control signal designated READ OUT which appears at the proper time on a read out control line 33. The output signals from these AND circuits are supplied to a decoding network 7 by which appropriate translation is made into a code effective to address the proper memory location in order to either store the information into the memory or to read out the information. In the arrangement shown in FIG. 2, the memory is of the magnetic core type having row and column drivers 35 and 37 which when rendered effective provide the appropriate address for a word stored in the core memory. During read out, a plurality of sense amplifiers 39 are arranged in the usual fashion to provide output signals to the individual stages of a memory register 11, which may constitute a plurality of storage latches as shown in connection with the interrogation register 5.

Outputs from memory register 11 may be supplied to appropriate utilization devices via output AND circuits such as 38 and 40, which are enabled as a result of the supply to one input of the AND circuits of a signal on an output control line 41. The outputs of memory register 11 are also supplied as one input to AND circuits in the comparing unit 15, such as the AND circuits 43 and 45. The other input to each of these AND circuits is the inverse output of the corresponding latch in the interrogation register 5, for example, the inverse output of latch 21 is supplied via a line 47 to the second input of AND circuit 43. The output of the AND circuits in the comparing unit 5 are supplied to the corresponding input AND circuit involved in a retrieval operation, such as the AND circuit 19 which also is arranged to receive the output of AND circuit 43, AND circuit 19 being enabled by a signal designated RETRIEVE.

Each channel in the system is provided with comparing circuitry similar to that described above. As long as the input latch is off, an output signal from the memory register will, with the inverse signal from the latch, such as 21, enable the AND gate and hence cause a signal to be supplied from the comparing unit, which will indicate "Not Equal," and cause a repetition of the operation. When the output from the latch and the memory finally match, no output occurs from the AND circuit, and retrieval is brought to an end.

The timing and control circuitry includes a cycle controlling element such as the flip flop 49 which is set to its on condition by operation of a starting switch ST. With flop flop 49 in its on condition, it enables an AND circuit 51 to pass recurrent pulses from an oscillator 53 or other signal generator to the input of a counter 55.

As counter 55 is stepped through its various states in response to the input pulses supplied thereto, output signals are supplied in sequence on a plurality of output control lines from the counter 55 as indicated by the signal lines designated ENTER, READ OUT, OUTPUT and CATEGORIZE. An output is also supplied from counter 55 to one input of an OR circuit 57, the output of which is designated as RETRIEVE. The second input to the OR circuit 57 is supplied from the output of an OR circuit 59, the inputs of which constitute output connections from each of the AND circuits in the comparing unit 15.

The output of OR circuit 59 is supplied via an inverter 61 to one input of an AND circuit 63, the other input to this AND circuit being the output control signal line 41. The output of AND circuit 63 is supplied via a line designated RST to the flip flop 49, and is effective to reset the flip flop to its initial condition. During the time that the system is retrieving information, the output from inverter 61 will be down, and hence there will be no input supplied therefrom to the input of AND circuit 63, however when retrieval has been accomplished, the input from inverter 61 will be up, and the following signal on the line 41 will enable AND circuit 63. The output from this AND circuit will then reset flip flop 49 to its initial condition and terminate the operating cycle of the system.

The operation of the system shown in FIG. 2 is essentially that described above in connection with the same general diagram of FIG. 1 and since the particular details have already been described, it is deemed unnecessary to repeat the description of operation.

While the invention has been particularly shown and described with reference to a preferred embodiment thereof, it will be understood by those skilled in the art that various changes in form and details may be made therein without departing from the spirit and scope of the invention.

What is claimed is:

1. An information retrieval system comprising, in combination, an adaptive categorizer including a plurality of threshold elements, each threshold element corresponding to a particular group of data to be retrieved from a number of groups of data, each threshold element having a plurality of weighted inputs corresponding to key data in the associated group of data, a memory connected to and governed by said categorizer, and containing said groups of data, readout means connected to said memory for reading out the data in said memory, comparing means connected to said inputs of said categorizer and to said memory for comparing the key data supplied to said categorizer and the key data in said memory, and entry means connected to said memory and said categorizer and governed by said comparing means for re-entering key data from said memory to said categorizer unless and until said comparing means indicates an equality between the data read from said memory and the data entered in said adaptive categorizer.

2. An information retrieval system as claimed in claim 1, in which said memory is of the type wherein data addressed to a particular storage location will provide a readout of additional data relevant to the addressed data.

3. An information retrieval system as claimed in claim 1, further characterized by means for re-cycling key data from data groups supplied from said memory to said adaptive categorizer.

4. An information retrieval system as claimed in claim 1, further including a utilization device to which data may be selectively supplied from said memory.

5. An information retrieval system as claimed in claim 1, further including data entry means for initially entering data in said adaptive categorizer and said memory.

6. An information retrieval system as claimed in claim 1, in which said adaptive categorizer is of the ramp-learning type and includes a ramp signal generator governed by a first and a second control channel governing the learning function and the categorizing function, respectively, and said system further including, readout control means connected to the output of said categorizer for supplying outputs from said categorizer to said memory, and having a third control channel governing the readout operation for said categorizer, a utilization device to which data may be regularly supplied from said memory under the control of a fourth control channel, timing and control means connected to said comparing means, said entry means and said first, said second, said third and said fourth control channels for governing the entry of data into said categorizer, and said memory, governing the output of data to said utilization device, and governing reentry of key data in cooperation with said comparing means, said timing means including a source of timing signals and a counter for counting said signals, connected to supply outputs at specific counts after the start of said counter, first manual control means connected to said categorizer for governing the initial entry of data to said categorizer, and second manual control means connected to said timing and control means for initiating the start of an operating cycle for said system.

References Cited

UNITED STATES PATENTS

| | | | |
|---|---|---|---|
| 3,147,343 | 9/1964 | Meyer et al. | 340—172.5X |
| 3,309,674 | 3/1967 | Lemay | 340—172.5 |
| 3,333,248 | 7/1967 | Greenburg et al. | 340—172.5 |
| 3,446,950 | 5/1969 | King et al. | 340—172.5X |
| 3,457,552 | 7/1969 | Asendorf | 340—172.5 |

PAUL J. HENON, Primary Examiner

S. R. CHIRLIN, Assistant Examiner